United States Patent [19]
Xie et al.

[11] Patent Number: 6,038,406
[45] Date of Patent: Mar. 14, 2000

[54] STORING INFORMATION FROM A WRITABLE CAMERA DISPLAY

[75] Inventors: Tong Xie, Rochester; Stanley W. Stephenson, Spencerport, both of N.Y.

[73] Assignee: Eastman Kodak Company, Rochester, N.Y.

[21] Appl. No.: 09/192,972

[22] Filed: Nov. 16, 1998

[51] Int. Cl.$^7$ .................................................. G03B 17/24
[52] U.S. Cl. ................................................................ 396/313
[58] Field of Search ............................................... 396/313

[56] References Cited

U.S. PATENT DOCUMENTS

| | | |
|---|---|---|
| 4,525,032 | 6/1985 | Hilsum . |
| 5,670,755 | 9/1997 | Kwon . |
| 5,689,742 | 11/1997 | Chamerlain, IV . |
| 5,695,682 | 12/1997 | Doane et al. . |
| 5,715,486 | 2/1998 | Kim et al. . |
| 5,717,967 | 2/1998 | Lee et al. ................................ 396/313 |
| 5,845,161 | 12/1998 | Schrock et al. ......................... 396/313 |

*Primary Examiner*—David M. Gray
*Attorney, Agent, or Firm*—Raymond L. Owens

[57] ABSTRACT

In a camera having a writable display, such camera being adapted to receive information written on the display and record such information in a memory storage inserted into the camera the writable display, including first and second layers which are brought into contact by the application of pressure by a stylist for writing on the display, a material composition disposed between the first and second layers which changes its visual characteristics when pressure is applied by the stylist on the first layer which applies pressure to the material composition, and the second layer including a material which when brought into contact with the first layer changes an electrical parameter; a plurality of electrodes associated with the display. Applying electrical potential to such electrodes for producing electrical signals representative of particular positions on written second layer of the display and circuitry for digitizing such signals and for recording digitized information onto the memory storage.

4 Claims, 3 Drawing Sheets

STORING INFORMATION FROM A WRITABLE CAMERA DISPLAY

CROSS REFERENCE TO RELATED APPLICATIONS

Reference is made to commonly-assigned U.S. patent application Ser. No. 09/182,924 filed Oct. 30, 1998, entitled "Driving a Memory Display in a Camera" by Stanley W. Stephenson, the disclosure of which is incorporated herein by reference.

FIELD OF THE INVENTION

The present invention relates to cameras having information recording capabilities.

BACKGROUND OF THE INVENTION

Silver halide film cameras capture scenes on a light sensitive emulsion. At the time of capture, it is useful to provide information of scene content, such as date, time or a descriptive embodiment. Kodak Autographic series of cameras, produced from 1914 to 1927 used a thin metallic sheet over the film to permit pressure induced writing on a sheet of silver halide film. The operator could not see the image they had written.

Many cameras have a battery powered clock, and a small array of light emitting diodes that can write the date/time information onto the film itself. U.S. Pat. No. 5,715,486 discloses a camera having a small keyboard for typing characters into a memory, showing those characters on display and writing the character over an image using the small array of light emitting diodes. These systems require an interface to the keyboard, and a display to observe typed characters. The operator is limited to characters on the keyboard.

Drawings can be displayed using cathode ray tubes, which require a large amount of power, and continuous electronic drive. Alternatively, drawings can be displayed by twisted nematic polarizing displays which require complex drive electronics. Writing can be detected; stored in a memory plane and continually written to such displays to create a writable tablet.

U.S. Pat. No. 4,525,032 discloses a display that uses cholesteric memory material that is pressure, electrical field and heat sensitive. Writing on the surface of such a display causes a change in optical properties of the bi-stable material. A high voltage pulse can be used to erase such a display. The patent further discloses means to sense the pen's position during writing so as to digitize the position of the pen during writing. Such a display has the advantage of showing erasable drawings, and digitizing said drawings.

Digitizing a stylus position using spaced, conductive sheets is disclosed in U.S. Pat. No. 5,670,755. Two conductive sheets are spaced apart with spacer beads and pressure is applied to bring the two sheets in contact at a given position. Two sets of orthogonal oriented conductors are used to find the resistive potential between each contact and the contact position. Alternatively in the patent, a potential on a stylus is used to find a contact position on the sheet.

A camera with image display and text information is disclosed in commonly-assigned U.S. Pat. No. 5,689,742. In that patent, a powered display shows a captured scene. A touch sensitive layer over the display senses contact position of a stylus, digitizes the position, stores those coordinates in a memory. The information is displayed over the image on the camera display. The patent requires the use of a pixelated, powered and electronically driven display to show the drawing to an operator.

SUMMARY OF THE INVENTION

Accordingly, it is an object of the present invention to provide a camera having a display onto which information can be readily recorded.

This object is achieved by camera having a writable display, such camera being adapted to receive information written on the display and record such information in a memory storage inserted into the camera the writable display, comprising:

(a) first and second layers which are brought into contact by the application of pressure by a stylist for writing on the display, a material composition disposed between the first and second layers which changes its visual characteristics when pressure is applied by the stylist on the first layer which applies pressure to the material composition, and the second layer including a material which when brought into contact with the first layer changes an electrical parameter;

(b) a plurality of electrodes associated with the display and means for applying electrical potential to such electrodes for producing electrical signals representative of particular positions on written second layer of the display; and (c) means for digitizing such signals and for recording digitized information onto the memory storage.

The invention has the advantage of permitting digitized written information to be recorded onto a storage medium such as a film. The user can see a complete image of the writing and can reuse the writing area. The displayed writing does not require a powered display and can be erased and re-used repeatedly.

DETAILED DESCRIPTION OF THE INVENTION

Figure 1:
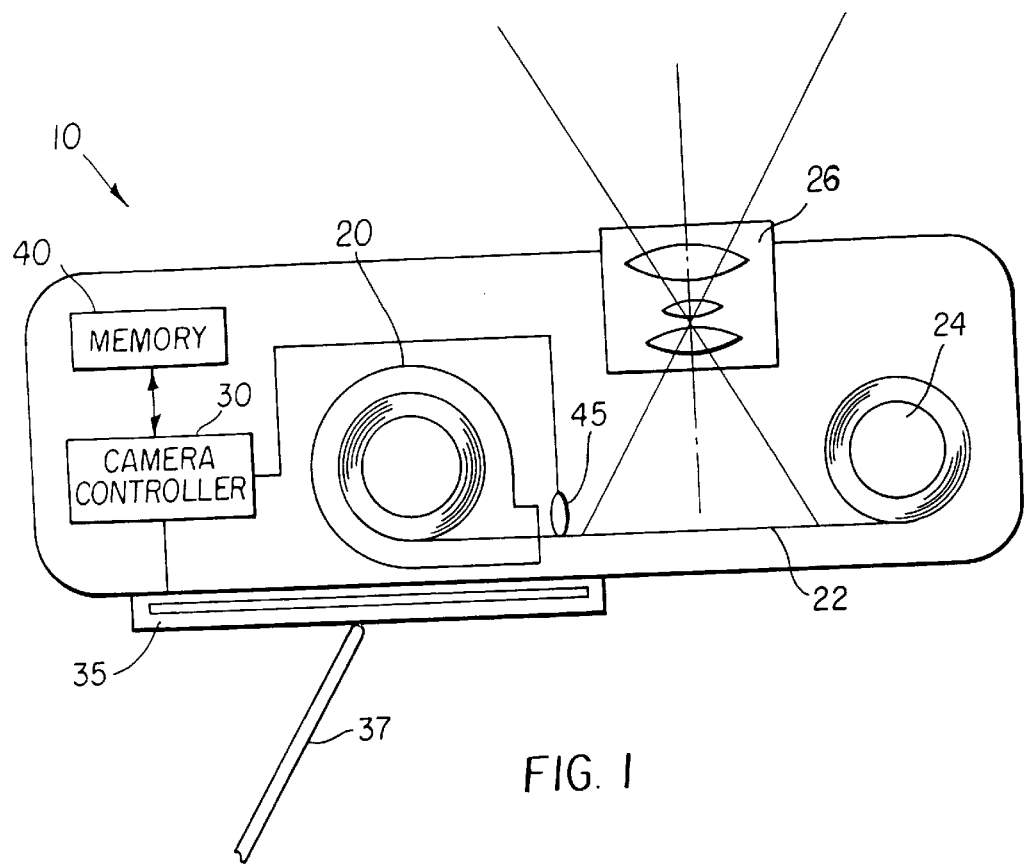
FIG. 1 is a top sectional view of a camera with a display in accordance with the present invention.

A top sectional view of a silver halide film camera 10 is shown in FIG. 1. A film cassette 20 in camera 10 holds a strip of film 22 that capture images from optic 26. Film 22 is sequentially taken up onto take-up spool 24 to capture a set of images. After image exposure is complete, film 22 is returned to film cassette 20. Camera controller 30 receives commands from an operator and controls the sequential motion of film 22 and exposure of film 22 by optic 26. Cartridge 20 is formed according the specifications set forth for the Advanced Photographic System. In accordance with that specification, film 22 incorporates a substantially transparent magnetic coating. Magnetic writer 45 is disposed in camera 10 to non-visibly store digital data on film 22.

Figure 2:
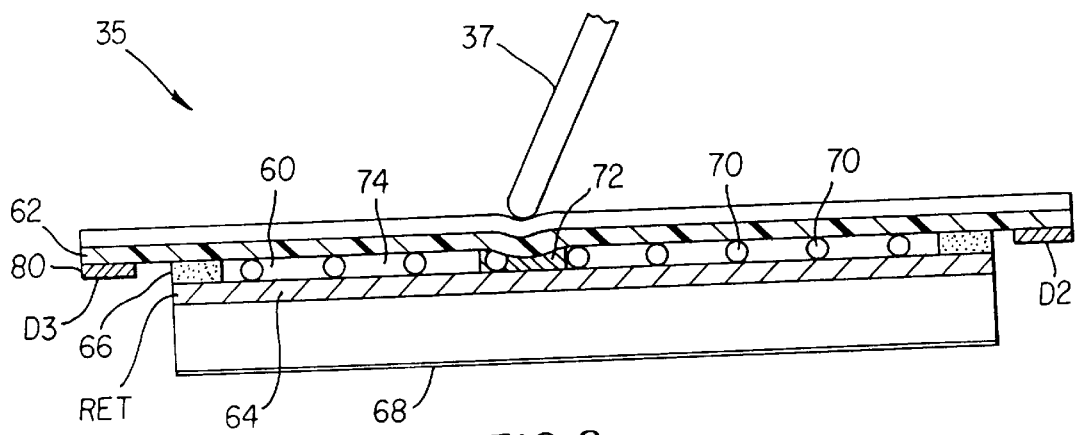
FIG. 2 is a side sectional view of the display of the camera of FIG. 1.

FIG. 2 is a section view of display 35 on camera 10. Display 35 consists of transparent top conductor 62 and a bottom conductor 64. Transparent top conductor 62 can be a transparent, low resistance coating of Indium-Tin-Oxide (ITO) on a 100 micron polyester sheet which faces bottom conductor 64. Bottom conductor 64 can be a conductive coating facing transparent top conductor 62. Bottom conductor 64 can be a transparent electrical conductor such as Indium-Tin-Oxide or a light absorbing conductor formed by an oxide of a metal such as platinum or nickel. In the case that bottom conductor 64 is transparent, a black coating 68 is painted on the back of bottom conductor 64 to absorb light passing through bottom conductor 64.

Memory material 60 is disposed between transparent top conductor 62 and bottom conductor 64. Memory material 60 can be a chiral doped nematic liquid crystal such as those disclosed in U.S. Pat. No. 5,695,682. Pressure, an electrical field or heat will change the state of chiral doped nematic materials from a transmissive to a reflective state. These materials have the advantage of maintaining either a transparent or reflective state indefinitely. Ambient light striking memory material will be reflected light, providing a "light" image or can be transmitted and absorbed by bottom conductor 64 or black coating 68 to provide a "dark" image. Memory material 60 can be a chiral nematic material dispersed in a polymer matrix. The polymer can be a de-ionized photographic gelatin or an ultra-violet polymerized monomer. Alternatively, memory material can be a fluid containing spacer beads 70.

In one experiment, a 100 micron polyester sheet was coated with Indium-Tin-Oxide (ITO) to form transparent top conductor 62. Transparent top conductor 62 was bonded by adhesive 66 over an ITO coated glass plate to create bottom conductor 64. When the two plates were bonded together, spacer beads 70 provided a 4 micron gap between the two plates. Black coating 68 was created using black paint on the back of bottom conductor 64. The gap was filled with E. M. Industries (Hawthorne, N.Y.) chiral nematic fluid BL126 to act as memory material 60. A 3 millisecond 40 volt pulse would orient memory material 60 to a transparent state so that incident light would pass through clear areas 74 and be absorbed by the black coating 68. The pressure of stylus 37 changed memory material 60 to reflecting area 72 to provide a permanent record of the tracings of stylus 37 across display 35.

Figure 3:
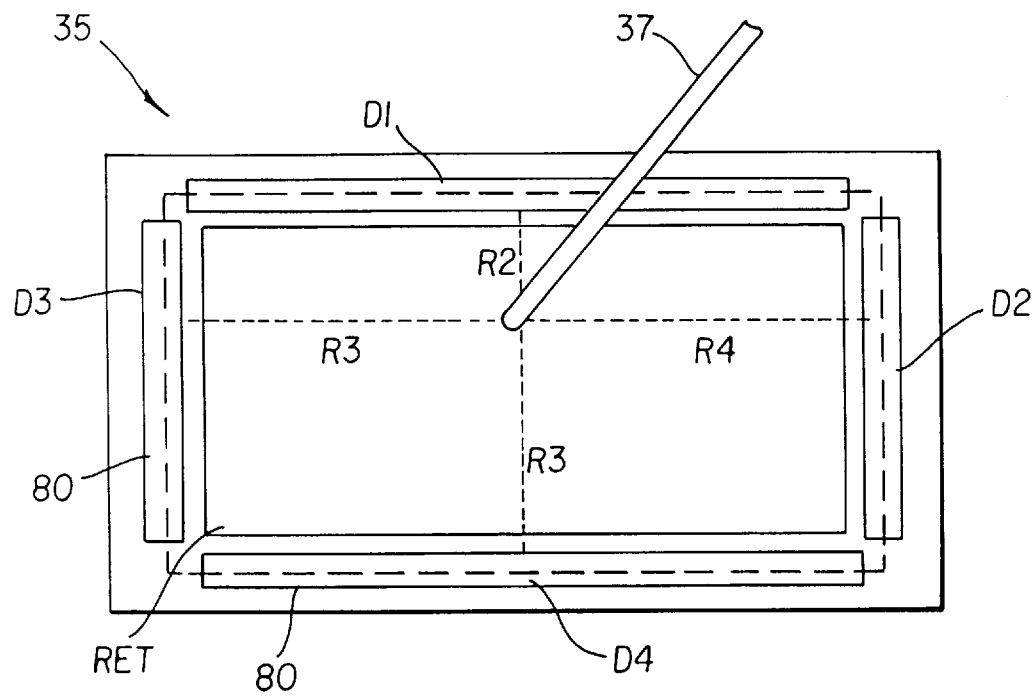
FIG. 3 is a front view of the display of FIG. 2.

FIG. 3 is a front view of display 35 having memory material 60. Transparent top conductor 62 is formed with a sheet resistance of 50–1000 ohms per square. Conductors 80 are formed on the four edges of transparent top conductor 62. Conductors 80 provide four output signals D1 through D4 to camera controller 30. An electrical return signal, RET, is created by a wire in contact with bottom conductor 64. The pressure of stylus 37 provides contact between transparent top conductor 62 and bottom conductor 64. Conductors 80 are used to measure the resistances R1 through R4 between each conductor D1 through D4 and the RET line from bottom conductor 64 to determine the position of contact for stylus 37.

Figure 4:
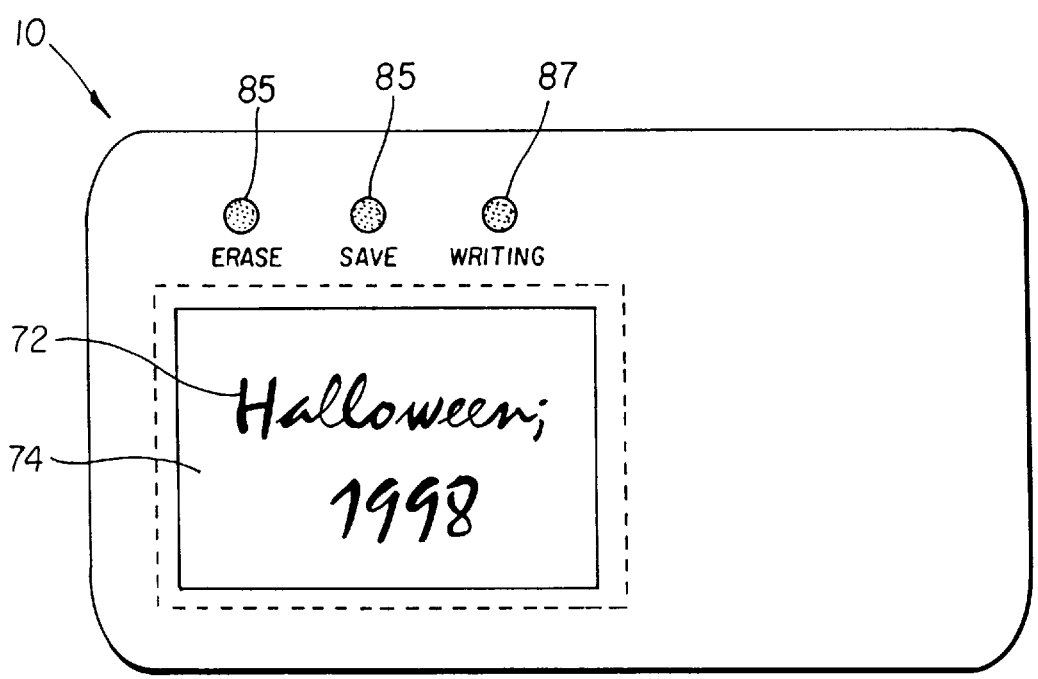
FIG. 4 is a back view of the camera of FIG. 1.

FIG. 4 is a back view of camera 10 having display 35. The contrast between reflecting area 72 formed by the writing pressure of stylus 37 and clear area 74 provide a visible record of the motion of stylus 37 across display 10. Two control buttons 85 are used to operate display 35. A first button, "ERASE" signals camera controller 30 to signal camera controller 30 to create a high voltage clearing voltage 92 between transparent top conductor 62 and bottom conductor 64 to clear display 35. The second button, "SAVE" indicates that the camera controller should save digitized data from display 35. Write indicator 87 illuminates when sufficient pressure is applied to stylus 37 to read resistance values R1 through R4.

Figure 5:
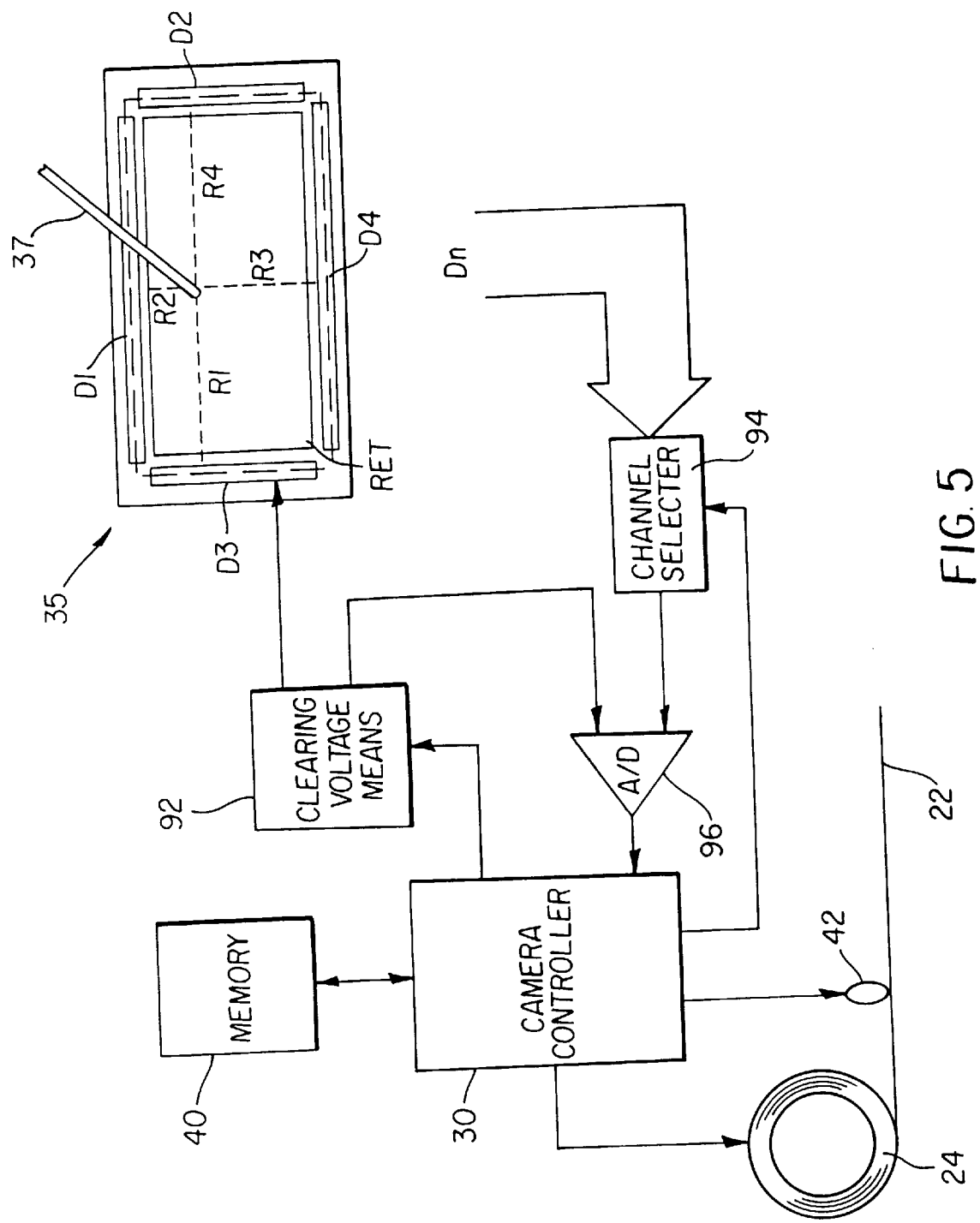
FIG. 5 shows an electrical circuit for recording information of the display of the camera of FIG. 1.

FIG. 5 is a schematic for camera 10 according to the present invention. An operator writes information onto display 35 using stylus 37. Camera controller 30 operates on channel selector 94 to read resistance values from each of four conductors 80 labeled D1 through D4. An analog-to-digital (A/D) converter provides digital input values for resistance values R1 through R4 from each of the four conductors D1 through D4.

Transparent top conductor 62 can be an ITO coating having a sheet resistance of 600 ohms per square. Conductors 80 are separate sputtered aluminum areas with sheet resistances under 0.1 ohms per square and are located on the four sides of display 35. Display 35 can be two inches high and three inches wide. The resistance between conductors D1 and D4 is 400 ohms and the resistance between side conductors D3 and D2 is 900 ohms. Bottom conductor is a platinum oxide coated metal plate with virtually no sheet resistance and is connected to a ground potential. Memory material 60 has high impedance of greater than $10^8$ ohms and is 10 microns thick. This configuration provides a resistance between bottom conductor 64 and conductors 80 of greater than one mega-ohm.

Display 35 is cleared by a 5 millisecond, 40 volt pulse between a selected one of conductors 80 and bottom conductor 64 using clearing voltage circuit 92. Application of stylus 37 onto the surface of display 35 moves transparent top conductor 62 into contact with bottom conductor 64. Analog to digital converter 96 sequentially senses the resistance between each of the conductors 80 and bottom conductor 64. The excitation voltage to read resistances R1 through R4 can be one volt. Because memory material 60 is a chiral nematic fluid, the 40 volt clearing voltage is significantly higher than the one volt sensing voltage. Thus memory material 60 is not converted to the clear state by the excitation voltages required by analog to digital converter 96.

The resistance between transparent top conductor 62 and bottom conductor 64 will be over 1 mega-ohm without pressure from stylus 37. When stylus 37 provides interconnection between transparent top conductor 62 and bottom conductor 64, resistance values for conductor D1 through D4 will be under a thousand ohms. The ratio of the resistances R1 and R3 provide the vertical location and the ratio of resistances D3 and D2 provides horizontal position of the contact point from stylus 37.

In the case that stylus 37 contacts the center of display 35 assume the value of R2 and R3 at 200 ohms, and the value of R1 and R4 at 450 ohms. In this situation, the ratio of the two resistances will be one. If the contact point shifts towards the sides of display 35, the ratio of the resistances will change from a value of one. In the case that the stylus is near the top of display 35, R2 will be close to zero, and R3 will be close to 400 ohms. The value will be constant with regard to the horizontal position of stylus 37. The same phenomenon is true of measuring the horizontal position of stylus 37 using the two side conductors 80.

Camera controller 36 continuously senses the resistances R1 through R4. If the resistance values are above 1,000 ohms, camera controller 36 knows that stylus 37 is not in contact with display 37. If resistances R1 through R4 are less than 1,000 ohms, then the ratio of the horizontal readings and vertical readings are used to find the contact position of stylus 37. Camera controller actuates write indicator 87 when stylus 37 has made contact to indicate to the operator that camera controller 30 is reading the position of stylus 37.

If the computed position is the same as the previous scan, then camera controller assumes that stylus 37 has not moved, and no new position data is stored. The scanning continues until an ERASE or SAVE signal is detected on control buttons 85. If the ERASE button is pressed, camera controller 30 erases display 35 and using clearing voltage circuit 92 starts a new list of coordinates in memory 40. If the SAVE button is pressed, the list of coordinates is written to a storage medium such as film 22 at an appropriate moment to create a record associated with a captured image. This can be done during the advance of film 22 to a new frame of film when film 22 is advanced onto take-up spool 24. At the time of advance, digital data in memory 40, corresponding to a stored written image, is written using magnetic writer 45 onto the magnetic coating of film 22.

Camera 10 can also be an electronic image capture system which stores image data on other media such as fixed or removable semi-conductor memory or digital recording media such as magnetic or optically responsive coatings. Digitized data from display 35 in memory 40 is associated with a captured image at operator command, and provides an associated record of writing with the captured images. The record of writing from display 35 and captured image data can be transferred electronically or physically from an electronic version of camera 10.

The invention has been described in detail with particular reference to certain preferred embodiments thereof, but it will be understood that variations and modifications can be effected within the spirit and scope of the invention.

PARTS LIST

- 10 camera
- 20 film cassette
- 22 film
- 24 take-up spool
- 26 optic
- 30 camera controller
- 35 display
- 37 stylus
- 40 memory
- 45 magnetic writer
- 60 memory material
- 62 transparent top conductor
- 64 bottom conductor
- 66 adhesive
- 68 black coating
- 70 spacer beads
- 72 reflecting area
- 74 clear area
- 80 conductors
- 85 control buttons
- 87 write indicator
- 92 clearing voltage circuit
- 94 channel selector
- 96 A/D converter

What is claimed is:

1. In a camera having a writable display, such camera being adapted to receive information written on the display and record such information in a memory storage inserted into the camera the writable display, comprising:

(a) first and second layers which are brought into contact by the application of pressure by a stylist for writing on the display, a material composition disposed between the first and second layers which changes its visual characteristics when pressure is applied by the stylist on the first layer which applies pressure to the material composition, and the second layer including a material which when brought into contact with the first layer changes an electrical parameter;

(b) a plurality of electrodes associated with the display and means for applying electrical potential to such electrodes for producing electrical signals representative of particular positions on written second layer of the display; and (c) means for digitizing such signals and for recording digitized information onto the memory storage.

2. The camera of claim 1 wherein the memory storage is a digital memory.

3. The camera of claim 1 wherein the memory storage is a photographic film or a magnetic strip on such film.

4. In a camera having a writable display, such camera being adapted to receive information written on the display and record such information onto a film inserted into the camera the writable display, comprising:

(a) first and second layers which are brought into contact by the application of pressure by a stylist for writing on the display, a material composition disposed between the first and second layers which changes its visual characteristics when pressure is applied by the stylist on the first layer which applies pressure to the material composition to write information, and the second layer including a material which when brought into contact with the first layer changes an electrical parameter;

(b) a plurality of first electrodes in contact with the first layer and a second electrode in contact with the second layer and addressing means for selectively applying first electrical potentials to such first electrodes for producing electrical signals representative of particular positions on written second layer of the display;

(c) means for digitizing such signals and for recording digitized information onto the film; and (d) means for applying a second electrical potential between at least one of the first electrodes and the second electrodes for erasing the written information in the second layer.

* * * * *